(12) United States Patent
Juntilla

(10) Patent No.: US 12,223,512 B2
(45) Date of Patent: Feb. 11, 2025

(54) TEXT MESSAGING APPLICATION, DATABASE AND SYSTEM FOR AUTOMATED VERIFICATION OF PRODUCT AUTHENTICITY

(71) Applicant: Nicholas Juntilla, Los Angeles, CA (US)

(72) Inventor: Nicholas Juntilla, Los Angeles, CA (US)

( * ) Notice: Subject to any disclaimer, the term of this patent is extended or adjusted under 35 U.S.C. 154(b) by 262 days.

(21) Appl. No.: 17/020,820

(22) Filed: Sep. 15, 2020

(65) Prior Publication Data

US 2021/0110406 A1    Apr. 15, 2021

Related U.S. Application Data

(63) Continuation-in-part of application No. 16/669,962, filed on Oct. 31, 2019, which is a continuation of
(Continued)

(51) Int. Cl.
*G06F 21/31*       (2013.01)
*G06K 19/06*      (2006.01)
(Continued)

(52) U.S. Cl.
CPC ..... *G06Q 30/018* (2013.01); *G06K 19/06037* (2013.01); *G06K 19/0723* (2013.01); *H04W 4/12* (2013.01)

(58) Field of Classification Search
CPC .......... G06Q 30/018; G06K 19/06037; G06K 19/0723; H04W 4/12; G06F 21/31;
(Continued)

(56) References Cited

U.S. PATENT DOCUMENTS 10,970,731 B1 *   4/2021   Latifi .................... H04L 51/10
11,288,623 B2 *   3/2022   Gillen .................. H04L 51/18
(Continued)

*Primary Examiner* — David J Pearson

(57) ABSTRACT

In one aspect, a computerized method for implementing a text messaging application, database, and system for automated verification of product authenticity includes the step providing an item for sale. The method includes the step of representing the item with a unique identifier (ID) code. The method includes the step of detecting that the item is purchased. The method includes the step of assigning an owner of the item to that unique ID code. The method includes the step of storing an owner identifier, the unique ID code, and a mobile-device number of the owner into a database. The method includes the step of providing an item ownership verification application. The item ownership verification application accesses the database. The method includes the step of, with item ownership verification application, providing an interface to the item ownership verification application in a purchaser's mobile device. The interface comprises a virtual button with a hyperlink that causes a text message to be sent to the owner's mobile device. The method includes the step of, via the interface to the item ownership verification application, receiving the unique ID code when the virtual button is clicked by the purchaser. The method includes the step of, with item ownership verification application, automatically generating and communicating a text message to the owner's mobile device using the mobile-device number. The text message comprises the unique ID code. The method includes the step of displaying the unique ID code on the owner's mobile device.

18 Claims, 18 Drawing Sheets

Related U.S. Application Data application No. 16/504,317, filed on Jul. 7, 2019, now abandoned.

(60) Provisional application No. 62/694,603, filed on Jul. 6, 2018.

(51) Int. Cl.
*G06K 19/07* (2006.01)
*G06Q 30/018* (2023.01)
*H04W 4/12* (2009.01)

(58) Field of Classification Search
CPC ............ H04L 9/3226; H04L 2209/805; H04L 9/3239; H04L 9/50
See application file for complete search history.

(56) References Cited

U.S. PATENT DOCUMENTS

| | | | | |
|---|---|---|---|---|
| 2012/0271712 | A1* | 10/2012 | Katzin | G06Q 20/047 |
| | | | | 705/14.51 |
| 2014/0351135 | A1* | 11/2014 | Brown | G06Q 30/0633 |
| | | | | 705/44 |
| 2016/0055470 | A1* | 2/2016 | Lynn | G06Q 20/322 |
| | | | | 705/21 |
| 2017/0032382 | A1* | 2/2017 | Shulman | G06Q 30/0185 |
| 2017/0316477 | A1* | 11/2017 | Prasad | G06Q 50/01 |
| 2018/0084404 | A1* | 3/2018 | Gupta | G06F 15/16 |
| 2019/0340623 | A1* | 11/2019 | Rivkind | G06F 21/31 |
| 2019/0392457 | A1* | 12/2019 | Kuntagod | H04L 67/12 |
| 2021/0135854 | A1* | 5/2021 | Karame | H04L 9/3247 |
| 2022/0084042 | A1* | 3/2022 | Tang | G06F 21/64 |
| 2023/0169154 | A1* | 6/2023 | Chua | G06Q 30/0185 |
| | | | | 726/26 |

\* cited by examiner

```
event History(address indexed _receiptId, address _newOwner);

struct Receipt {
    uint256 id;
    uint created;
    address owner;
    address holder;
    bytes32 name;
    uint256 location;
    bytes32 description;
    uint256 mediaLinks;
}
mapping (uint256 => Receipt) public receipts;

function addReceipt(
    uint256 _id,
    address _owner,
    address _holder,
    bytes32 _name,
    uint256 _location,
    bytes32 _description,
    uint256 _mediaLinks ) public {
  var newReceipt = Receipt(_id, _owner, _holder, _name, _location, _description, _mediaLinks);
  receipts[_id] = newReceipt;
} function changeOwner(uint256 _receiptId, address _newOwner)
public
{
  require(msg.sender == receipts[_receiptId].owner);
  emit History(_receiptId, _newOwner);
  receipts[_receiptId].owner = _newOwner;
}
```

Item ID
43556GVJKSKH6I484
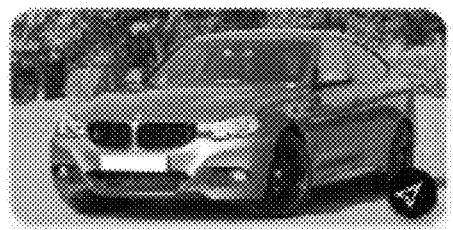
Year: 2011
Brand: BMW
Model: 550i
VIN H45834KJBKBV487TKBK4BT
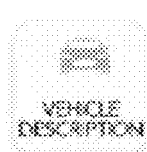  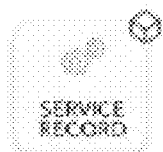
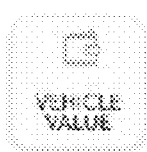 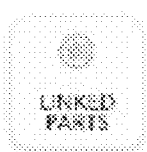 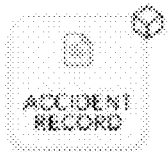
OWNER HISTORY
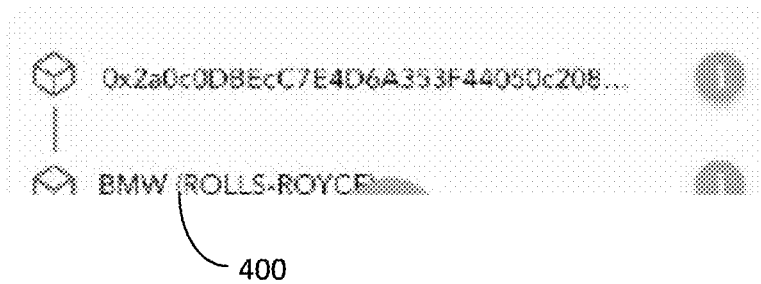
400
FIGURE 4

```
contract OwnershipRecordContract { event Record(bytes62 indexed id, bytes62 sig, string data);

function addRecord(bytes62 _id, bytes62 _sig, string _data) public {
        Record(_id, _sig, _data);
    }
}
```

This "addRecord" method might be called with these parameters:
(
"76F81B1EA467C25842D9E92B91BD1A18D51665ADCC7AF65255655097C0AB58DB",
"0x95618ae6abfeb614e80bdf55fe082c4b6f65480b99222cf6baf65d08bba4d5510fa77b496ed847ad6c2d46ba2168
7588167099e4a6ce91b0b1bf2c467c9bbd691c",
"owner:'0xE94F5a900794676fa9B1140d9dD6767d0219b99f',holder:'0xE94F5a900794676fa9B1140d9dD67
67d0219b99f',name:'2018 Honda',location:'40.741895,-76.989608'"
)

```
event NewOwner(bytes32 indexed _receiptId, address _newOwner);
event NewData(bytes32 indexed _receiptId, address _newData);

struct Receipt {
    address owner;
    string data;
}
mapping (bytes32 => Receipt) public receipts;

function addReceipt(
    bytes32 _id,
    address _owner,
    data _string

) public {
    var newReceipt = Receipt(_id, _owner, _string);
    receipts[_id] = newReceipt;
  } function changeOwner(bytes32 _receiptId, address _newOwner)
   public
   {
     require(msg.sender == receipts[_receiptId].owner);
     emit NewOwner(_receiptId, _newOwner);
     receipts[_receiptId].owner = _newOwner;
   } function changeData(bytes32 _receiptId, string _newData)
   public
   {
     require(msg.sender == receipts[_receiptId].owner);
     emit NewData(_receiptId, _newData);
     receipts[_receiptId].data = _newData;
   }
```

Ownerfy.com

Tag ID: 4DvEYz

Hi, this bag belongs to L. Smith
Please verify that the code matches the one received by the owner.

48871

Send Verification Code

—1300

Ownerfy.com
---
Tag ID: 4DvEYz
Hi, this bag belongs to L. Smith
This item has been temporarily verified by the Ownerfy.
 5 seconds remaining...
1800
FIGURE 18

TEXT MESSAGING APPLICATION, DATABASE AND SYSTEM FOR AUTOMATED VERIFICATION OF PRODUCT AUTHENTICITY

CROSS-REFERENCE TO RELATED APPLICATIONS

This application claims priority from U.S. Pat. No. 16,669,962, titled METHODS AND SYSTEMS FOR TRACKING OWNERSHIP OF GOODS WITH A BLOCKCHAIN and filed on 31 Oct. 2019. This application is hereby incorporated by reference in its entirety. U.S. Pat. No. 16,669,962 claims priority from and is a continuation in part of U.S. Pat. No. 16,504,317, titled METHODS AND SYSTEMS FOR TRACKING OWNERSHIP OF GOODS WITH A BLOCKCHAIN and filed on 7 Jul. 2019. This application is hereby incorporated by reference in its entirety. U.S. Pat. No. 16,504,317 claims priority from and is a continuation in part of U.S. provisional patent application no. 62694603, titled METHODS AND SYSTEMS FOR TRACKING OWNERSHIP OF GOODS WITH A BLOCKCHAIN and filed on 6 Jul. 2018. This application is hereby incorporated by reference in its entirety.

BACKGROUND

Owners of product may wish to sell their products. These can be consumer-to-consumer and business-to-consumer sales. They can also be on a website and/or in person. However, the potential buyers may not trust the chain of ownership of the product. This lack of trust can hurt sales opportunities for sellers. Accordingly, improvements to tracking ownership of goods with a blockchain are desired.

BRIEF SUMMARY OF THE INVENTION

In one aspect, a computerized method for implementing a text messaging application, database, and system for automated verification of product authenticity includes the step providing an item for sale. The method includes the step of representing the item with a unique identifier (ID) code. The method includes the step of detecting that the item is purchased. The method includes the step of assigning an owner of the item to that unique ID code. The method includes the step of storing an owner identifier, the unique ID code, and a mobile-device number of the owner into a database. The method includes the step of providing an item ownership verification application. The item ownership verification application accesses the database. The method includes the step of, with item ownership verification application, providing an interface to the item ownership verification application in a purchaser's mobile device. The interface comprises a virtual button with a hyperlink that causes a text message to be sent to the owner's mobile device. The method includes the step of, via the interface to the item ownership verification application, receiving the unique ID code when the virtual button is clicked by the purchaser. The method includes the step of, with item ownership verification application, automatically generating and communicating a text message to the owner's mobile device using the mobile-device number. The text message comprises the unique ID code. The method includes the step of displaying the unique ID code on the owner's mobile device.

BRIEF DESCRIPTION OF THE DRAWINGS

The present application can be best understood by reference to the following description taken in conjunction with the accompanying figures, in which like parts may be referred to by like numerals.

FIG. 3 illustrates an example screen shot of pseudo-code useful for tracking ownership of goods with a blockchain, according to some embodiments.

FIG. 4 illustrates an example screen shot of good with ownership tracked with a blockchain, according to some embodiments.

FIG. 7 illustrates an example screenshot of pseudocode useful for the improvement of data storage on a blockchain using an event log, according to some embodiments.

FIG. 8 illustrates an example screenshot of pseudocode useful for improving the combine best traits the various processes provided herein, according to some embodiments.

FIGS. 13-18 illustrate example screenshots illustrating an implementation of verification of product authenticity via text messaging, according to some embodiments.

Figure 1:
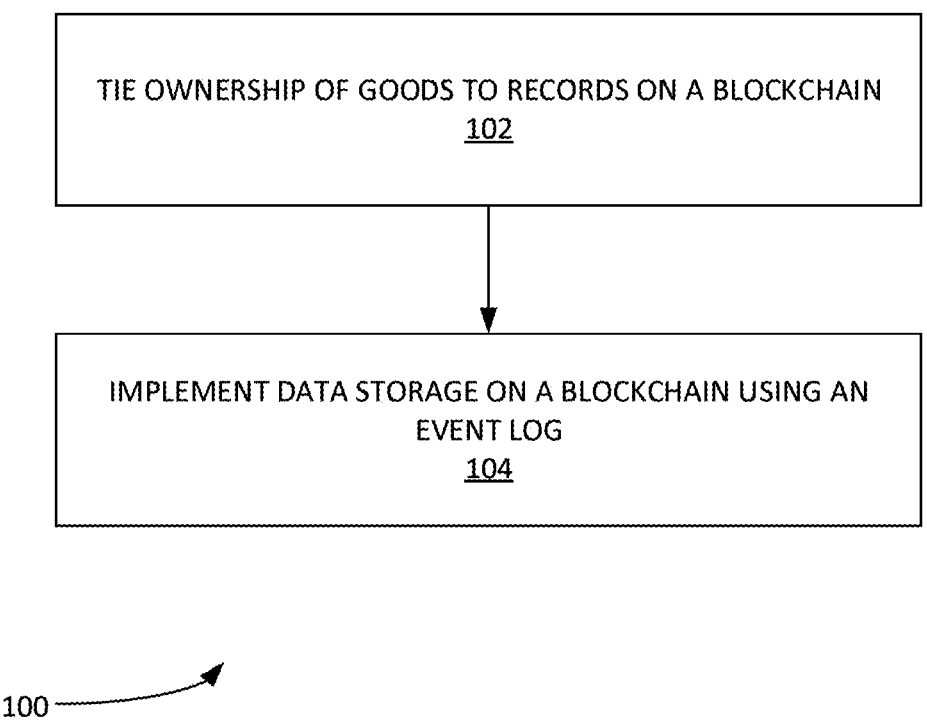
FIG. 1 illustrates an example process for tracking ownership of goods with a blockchain, according to some embodiments.

The Figures described above are a representative set and are not an exhaustive with respect to embodying the invention.

DESCRIPTION

Disclosed are a system, method, and article of manufacture for verification of text messaging application, database, and system for automated verification of product authenticity. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Blockchain can be a continuously growing list of records (e.g. blocks), which are linked and secured using cryptography. Each block typically contains a cryptographic hash of the previous block, a timestamp, and transaction data.

Hashing is a method of cryptography that converts any form of data into a unique string of text. Any piece of data can be hashed, no matter its size or type. It is noted that, regardless of the data's size, type, or length, the hash that any data produces is always the same length. A hash is designed to act as a one-way function, a system can put data into a hashing algorithm and obtain a unique string. A unique piece of data will always produce the same hash.

JavaScript Object Notation or JSON is an open-standard file format that uses human-readable text to transmit data objects consisting of attribute—value pairs and array data types (or any other serializable value).

Matrix code can be a 2D barcode and is a two-dimensional way to represent information. It noted that a linear (e.g. one one-dimensional) barcode can be utilized as well.

Near-Field-Communication (NFC) is a set of communication protocols for communication between two electronic devices over a distance of 4 cm (1½ in) or less. NFC offers a low-speed connection with simple setup that can be used to bootstrap more-capable wireless connections. NFC devices can act as electronic identity documents.

NoSQL database provides a mechanism for storage and retrieval of data that is modeled in means other than the tabular relations used in relational databases.

Text messaging, or texting, is the act of composing and sending electronic messages, typically consisting of alphabetic and numeric characters, between two or more users of mobile devices, desktops/laptops, or other type of compatible computer. Text messages may be sent over a cellular network, or may also be sent via an Internet connection.

QUICK RESPONSE CODE® (QR) is a type of matrix barcode (e.g. a two-dimensional barcode).

Radio-frequency identification (RFID) uses electromagnetic fields to automatically identify and track tags attached to objects. An RFID tag consists of a tiny radio transponder; a radio receiver and transmitter.

Example Systems and Methods

FIG. 1 illustrates an example process 100 for tracking ownership of goods with a blockchain, according to some embodiments. In step 102, process 100 can tie the ownership of goods to records on the blockchain. In step 104, process 100 can provide for an improvement of data storage on a blockchain using an event log.

Figure 2:
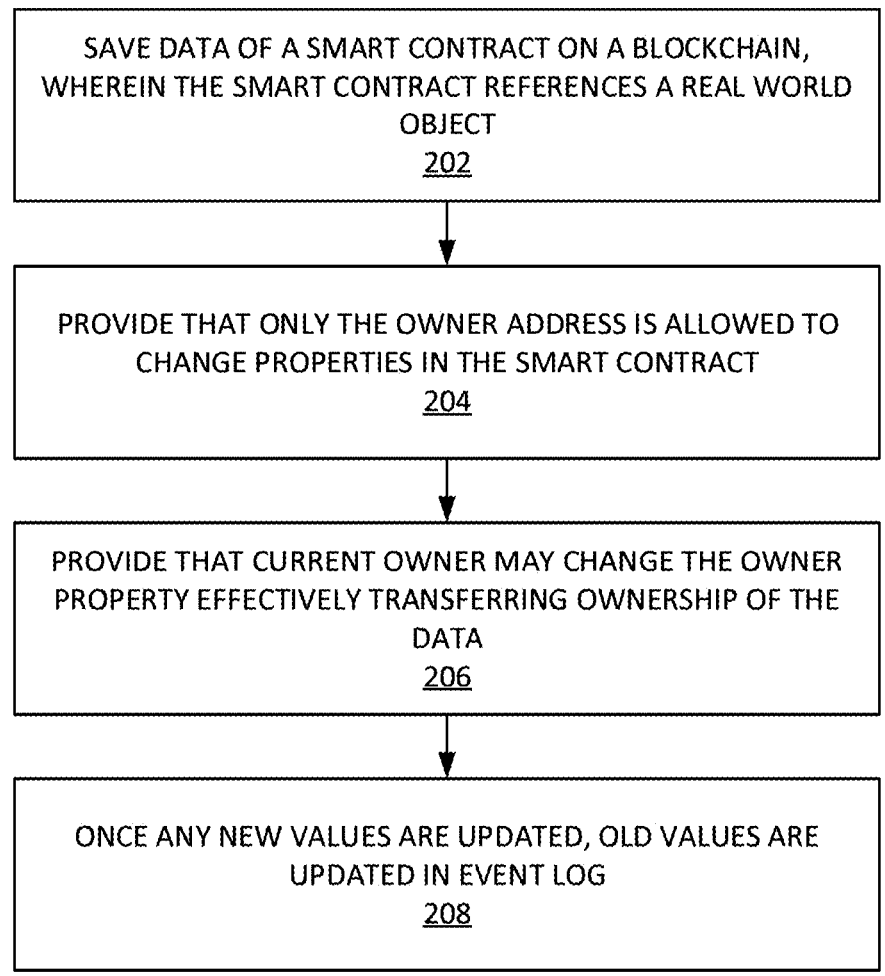
FIG. 2 illustrates another example process for tracking ownership of goods with a blockchain, according to some embodiments.

FIG. 2 illustrates another example process 200 for tracking ownership of goods with a blockchain, according to some embodiments. In step 202, process 200 saves data on the blockchain in a smart contract that references a real-world object. The smart contract can act as a tool for keeping track of object ownership. Examples of that data saved in the smart contract include, inter alia: identifier(s), owner data, address data, holder data, name data, location data, and/or description data. The identifier of the data is a hash of some media (e.g. an image and/or video file).

It is noted that blockchain ownership records provide chronological mathematical proof that certain data exist in a specific chronological order. Adding a descriptions of physical items to data such as hash of a photograph indicates that data existed in a specific chronological order. In this way, the history of an item can be built up over time and the history can be used to verify the origin. Blockchains can use private and public key technology. Records can be owned by keypairs and may only be transferred and updated by holders of those keypairs. This ensures a record passed through specific entity like an official brand (e.g. Nike®, etc.) and ensures authenticity an item.

In step 204, it is provided by process 200 that only the owner address is allowed to change properties in the smart contract. The owner is the person who holds the private key of the address. The address is a number (e.g. a public key, etc.). The public key can be used to assign an item to a user.

It is noted that the owner in process 200 can refer to the holder of the private key that corresponds to the public key. Each public key has a corresponding private key. Only the owner of the private key can change the data in the smart contract (e.g. on the blockchain). Process 200 can utilize an application to hold the private keys for each user so that the user can conveniently make transactions through the application. The mechanism for limiting who can change data on a smart contract is built into blockchain and smart contract technology. For example, a smart contract can be written where anyone can change the data, but in this case only the private key owner who is listed as 'owner' in the smart contract can change the data. Process 200 can provide smart contracts built to only respond to certain private keys. Additionally, the smart contracts can be done specifically with data relating to physical items. The application can be used with physical items for example having an owner field, type, location etc.

In step 206, it is provided by process 200 that the current owner may change the owner property effectively transferring ownership of the data. In step 208, once any new values are updated, the old values are updated in the event log by process 200.

FIG. 3 illustrates an example screen shot 300 of pseudo-code useful for tracking ownership of goods with a blockchain, according to some embodiments. FIG. 4 illustrates an example screen shot of good with ownership tracked with a blockchain, according to some embodiments.

Figure 5:
FIG. 5 illustrates an example matrix code, according to some embodiments.

FIG. 5 illustrates an example matrix code, according to some embodiments. The matrix code can be a QR code. In one example, to find out more information about an item a QR code is generated by the system as demonstrated in FIG. 5, according to some embodiments. A user can scan the QR code to fetch history information about the item. This can be done in the application or on a public website. This information can include, inter alia: include ownership history, details about the item, links to relative websites, and the ability to contact the owner. An example of that information is shown in FIG. 4 supra. An obfuscated user ID and/or real name may be shown in the owner history. The ownership chain of an item may be used to identify authenticity. Genuine products can originate with the maker of those products as well.

Figure 6:
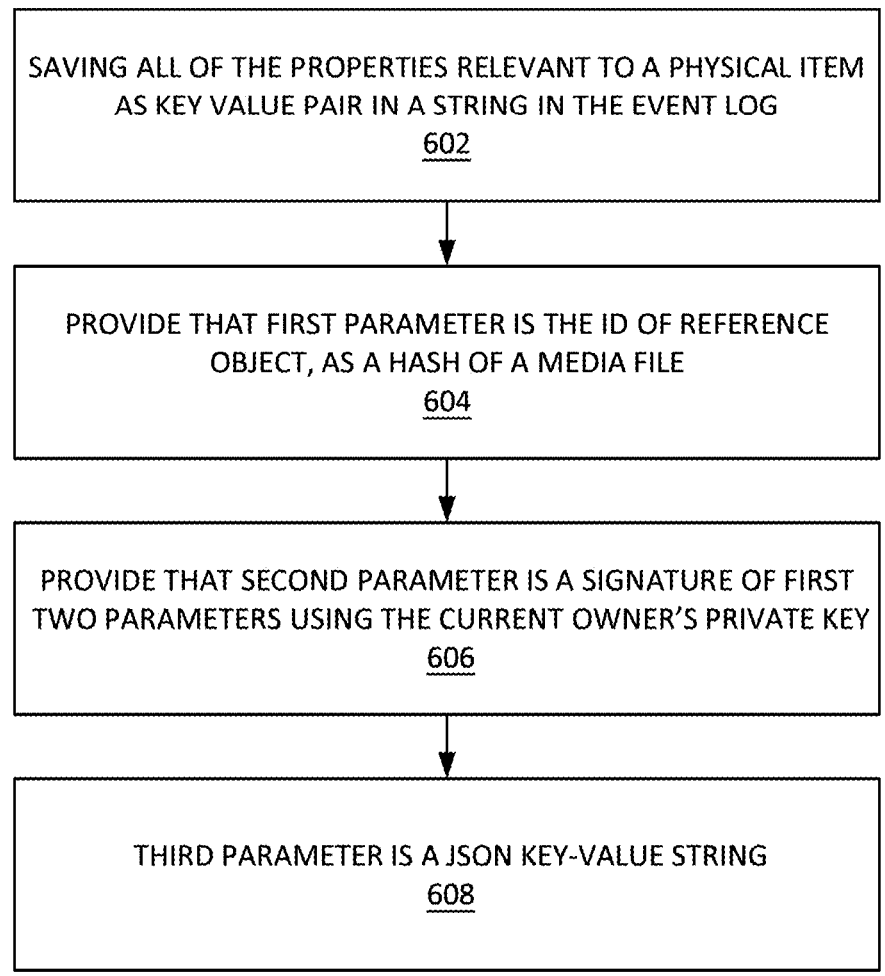
FIG. 6 illustrates an example process for improvement of data storage on a blockchain using an event log, according to some embodiments.

FIG. 6 illustrates an example process 600 for improvement of data storage on a blockchain using an event log, according to some embodiments. In order to save on ETHEREUM gas fees while saving data to the blockchain process 600 can save the relevant data in a more efficient way. In step 602, process 600 can save all of the properties relevant to a physical item as key value pair in a string in the event log. This is a more compact way of saving the same data shown in the first example. Instead of parameters being separated out, each having their own memory space. Process 600 can gather key-value pairs into one variable that we save on to the blockchain. In order to keep track of who is allowed to add new properties to an item we can sign this data with the caller's private key. Using this method one function can be used to replace all the variables in the first example. In step 604, process 600 can provide that the first parameter is the ID of the reference object is a hash of a media file. In step 606, process 600 can provided that the second parameter is a signature of the first two parameters using the current owner's private key. In step 608, process 600 can provide that the third parameter is a JSON key-value string.

It is noted that Using this method we can call one function to add an arbitrary number of parameters to the blockchain. Process 600 can provide three major benefits including, inter alia, the following. The gas fees to write the ETHEREUM event log can be less than using smart contract storage space. Provide 600 can add new key-value pairs to our smart contract after it has been deployed because the keys are defined in the string rather than the smart contract. When saving string data in a string, process 600 can use the JSON format to create nested key-value pairs and arrays. This data can be parsed and inserted into a NoSOL style databases. When parsing this data, the reading application can check signatures and validate if the current owner is adding properties. The properties can be read from the event log later with the most current valid keys replacing older valid keys. After reading the entire event log the current value keyset be identified relating to in ID.

FIG. 7 illustrates an example screenshot of pseudocode 700 useful for the improvement of data storage on a blockchain using an event log, according to some embodiments.

FIG. 8 illustrates an example screenshot of pseudocode 800 useful for improving the combine best traits the various processes provided herein, according to some embodiments. The item identity files to store files can be structured in such a way that all the variable data is stored in a string in the smart contract storage, but still protected by being updated by an authorization function. In this example, the current data is accessible in the current contract storage as a string that stores JSON data. This can more efficient than saving individual properties. The history of data changes is saved in the event log. Having the entire blockchain is not necessary in order to see the current properties of an item and some gas is saved by storing it in string format. The method of FIG. 8 can be used on a private blockchain to decrease the fees more and then save periodic updates on the main chain.

Figure 9:
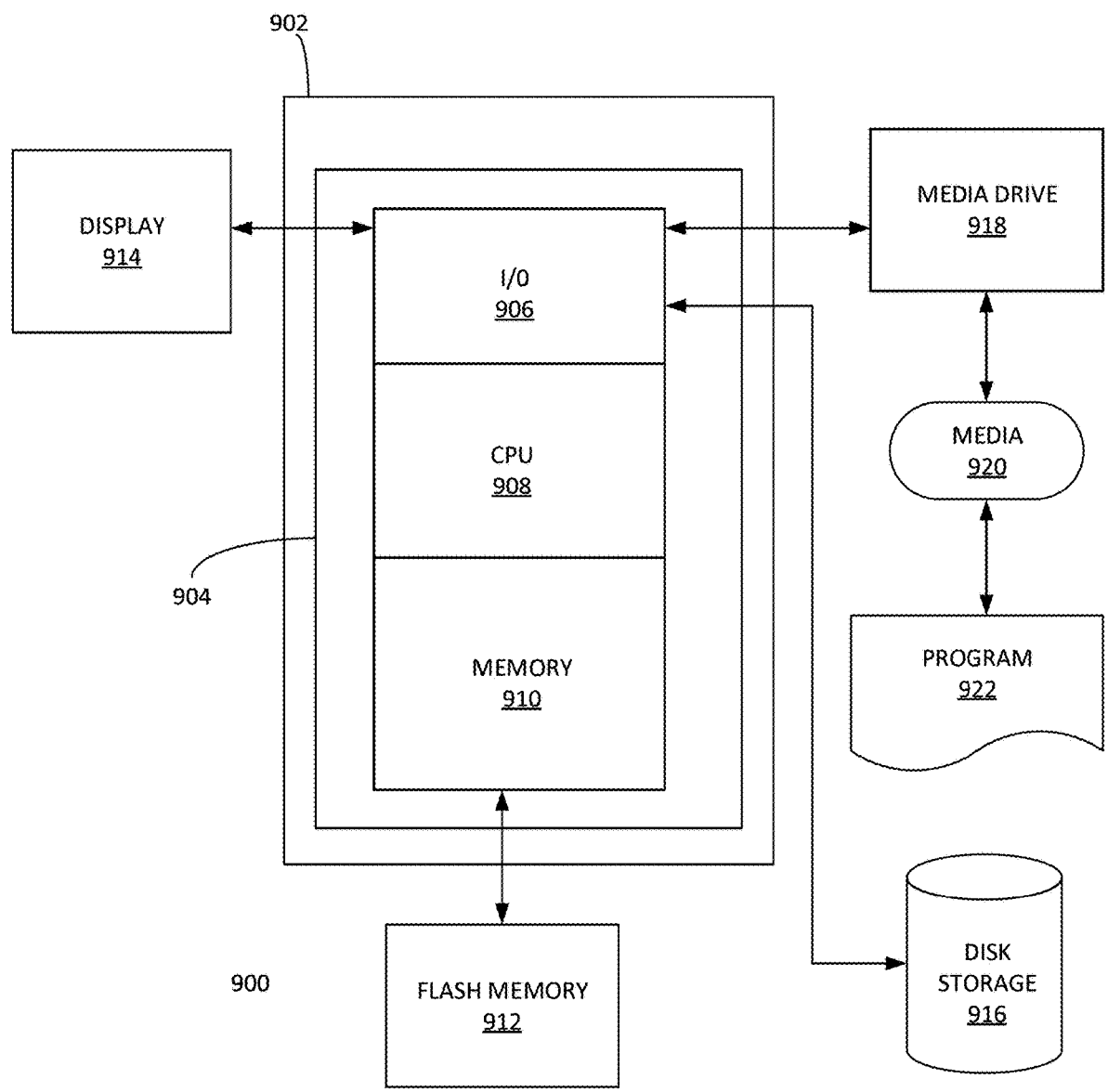
FIG. 9 depicts an exemplary computing system that can be configured to perform any one of the processes provided herein.

FIG. 9 depicts computing system 900 with a number of components that may be used to perform any of the processes described herein. The main system 902 includes a motherboard 904 having an I/O section 906, one or more central processing units (CPU) 908, and a memory section 910, which may have a flash memory card 912 related to it. The I/O section 906 can be connected to a display 914, a keyboard and/or other user input (not shown), a disk storage unit 916, and a media drive unit 918. The media drive unit 918 can read/write a computer-readable medium 920, which can contain programs 922 and/or data. Computing system 900 can include a web browser. Moreover, it is noted that computing system 900 can be configured to include additional systems in order to fulfill various functionalities. Computing system 900 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 10:
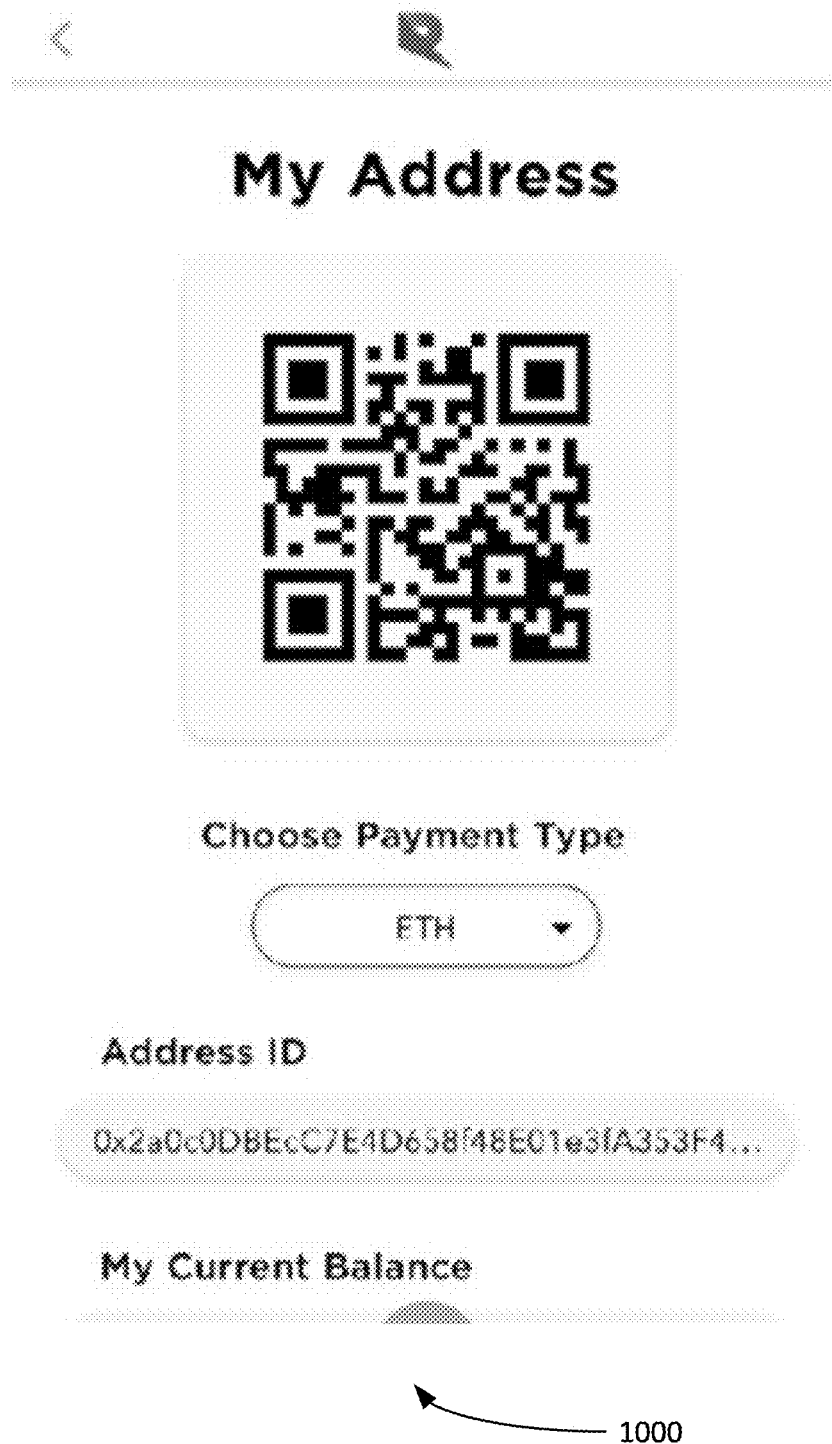
FIG. 10 illustrates an example screenshot of a QR used to transfer ownership, according to some embodiments.

FIG. 10 illustrates an example screenshot 1000 of a QR used to transfer ownership, according to some embodiments. Present methods and systems and use QR codes (and/or other matrix-based codes) to assist users in the transfer of ownership. For example, a first user can scan a QR code of another user and then transfer the ownership of an item to the first user. The information associated with the transfer can be utilized by processes 100-200 and 600. Screenshot 1000 is an example QR code screen.

Figure 11:
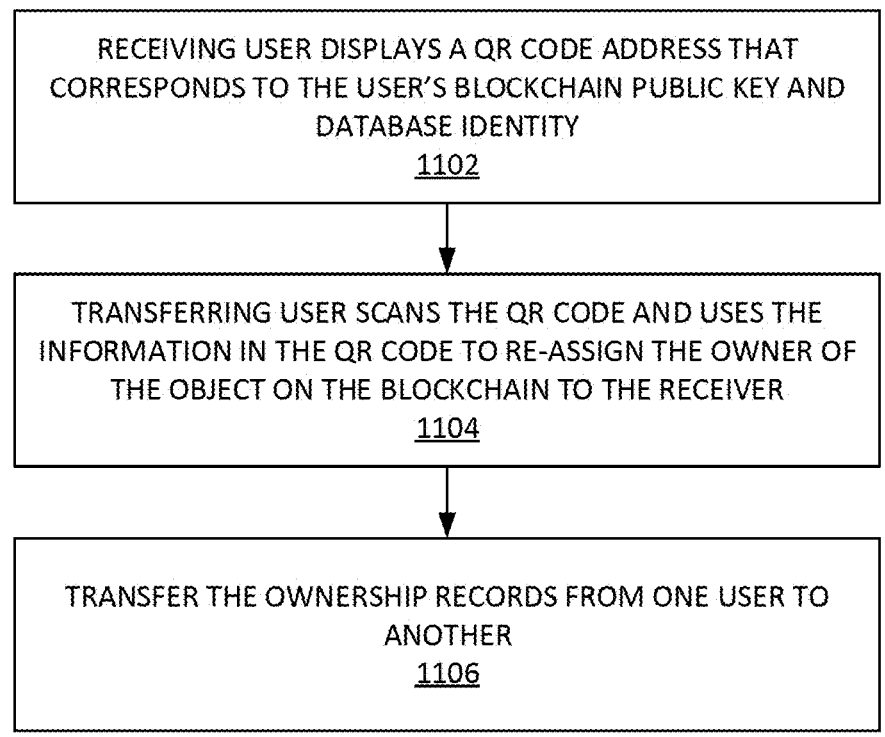
FIG. 11 illustrates another example process for implementing a QR Code transfer, according to some embodiments.

FIG. 11 illustrates another example process 1100 for implementing a QR Code transfer, according to some embodiments. In step 1102, the receiving user displays a QR code address that corresponds to the user's blockchain public key and database identity in the system. For example, this can be a supplementary data in a traditional database.

In step 1104, the transferring user scans the QR code and uses the information in the QR code to re-assign the owner of the object on the blockchain and in the system to the receiver. It is noted that this can also be done without scanning the QR code by entering in the receiver address by hand and then hitting the send button. In step 1106, the process 1100 transfers the ownership records from one user to another. It is noted that process 100 can limit the ability edit or transfer the record to the owner.

It is noted that the holder and the owner can be two different entities. The holder of an object can be an entity who currently possesses it. For example, FIG. 3 supra illustrates an example holder field and owner field. In one example, the holder can be an entity that is holding a package, but the package data on the blockchain can only be altered by the owner (e.g. as the private key holder). In this way, the private key holder is the owner. The private key is maintained in a database associated with the user account. It is noted that, in some examples, the user can download their private key and save it on paper as well. Accordingly, the owner can let someone an item (e.g. a baseball bat) for instance and change the holder to another entity (e.g. 'Ben', etc.). It is also noted that, in one example, a QR code can be used to transfer ownership or possession of a physical object even without a blockchain.

Verification of Product Authenticity via Text Messaging

Figure 12:
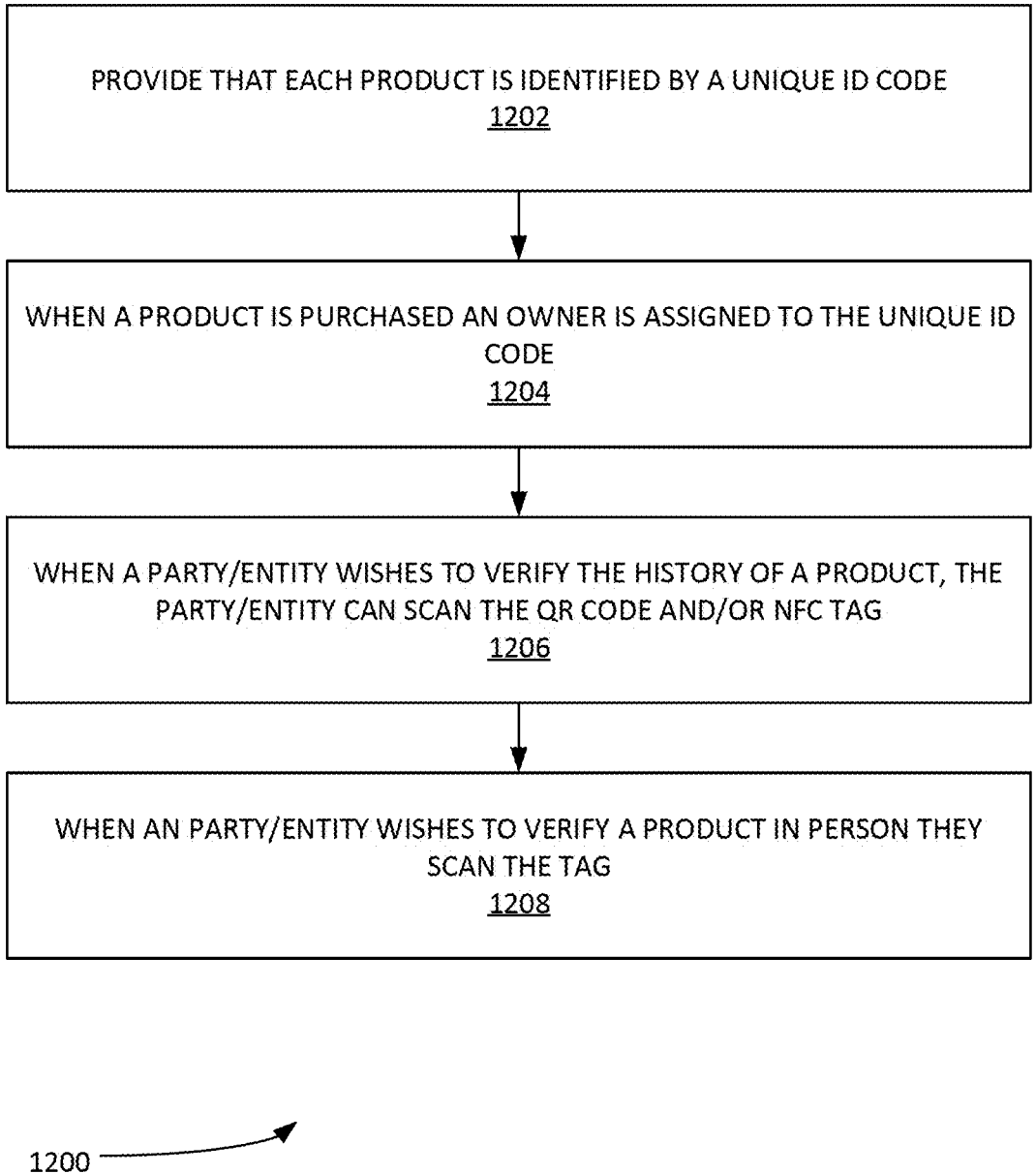
FIG. 12 illustrates an example process for verification of product authenticity via text messaging, according to some embodiments.

FIG. 12 illustrates an example process 1200 for verification of product authenticity via text messaging, according to some embodiments. In step 1202, each product in the system is identified by a unique ID code. For example, the unique ID code can be represented by a QR code (and/or other matrix code, etc.), NFC tag, and/or RFID system. It is noted that the QR code or NFC tag is packaged with or attached to the item. In step 1204, when a product is purchased an owner is assigned to the unique ID code. The owner of the code provides process 1200 with a phone number (e.g. a cell-phone number, etc.). The phone number is entered in a database accessible by process 1200. In step 1206, when a party/entity wishes to verify the history of a product, the party/entity can scan the QR code and/or NFC tag. The unique product ID can also be entered manually into process 1200 in some example embodiments.

In step 1208, when a party/entity wishes to verify a product in person they scan the tag. The scanning process causes step 1208 to obtain and open a web page with a verification button. Clicking the verification button generates a secret short code that is displayed to the verifier. The secret code is sent to the phone number on in the database.

It is noted that only one phone number (e.g. cell phone number, etc.) may be registered per each secret code. For example, if an attacker fakes a QR code or an NFC tag, it is still difficult to fake and/or spoof an entire telephony system and/or intercept a text message.

In process 1200, the sender (e.g. the verifier) knows the secret code and asks the owner what the secret code as a verification process. If the owner can repeat the secret code back to the sender then it is determined that the secret codes match and the owner is verified. This ensures that the person verifying the secret code is the registered owner of the product.

In one example, the sender can also verify the secret code through secure email and/or other secure electronic communication methods. The owner can revert the secret code back to the sender via email (and/or other secure electronic communication method) to prove they know the secret code.

It is noted that contacting the owner increases the likelihood that a product someone is trying to sell is authentic. If the owner were to sell that product to the verifier and then transfer the ownership, they can only do so a single time. If the owner wanted to do so a second time they would no longer be the registered owner and could not be verified.

Figure 13:

FIGS. 13-18 illustrate example screenshots 1300-1800 illustrating an implementation of verification of product authenticity via text messaging, according to some embodiments. FIG. 13 illustrates an example screen shot 1300 of mobile device application that enables user to obtain a unique ID code. The button can be used to send the unique ID code to the owner's phone number (e.g. via a text message, etc.). Screenshot 1300 can be displayed on a buyer's mobile device during a transaction for an item.

Figure 14:
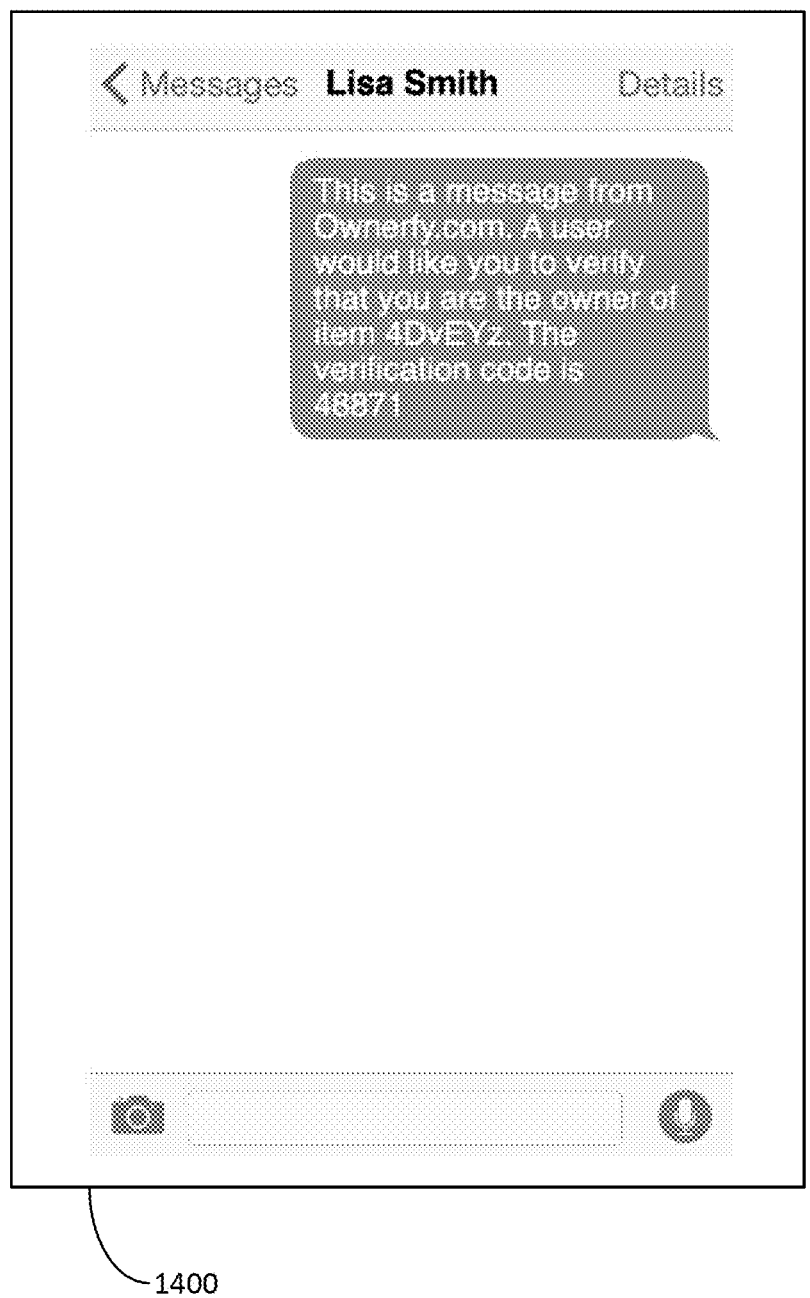

FIG. 14 illustrates an example screen shot 1400 of the owner receiving the unique ID code via text message. These two numbers can be compared to ensure that the putative owner is the real owner. Process 1200 can be used to implement the operations of these two screen shots. It is noted that item can be identified by a code and the ownership can be authenticated with another unique id code.

Figure 15:
Figure 16:
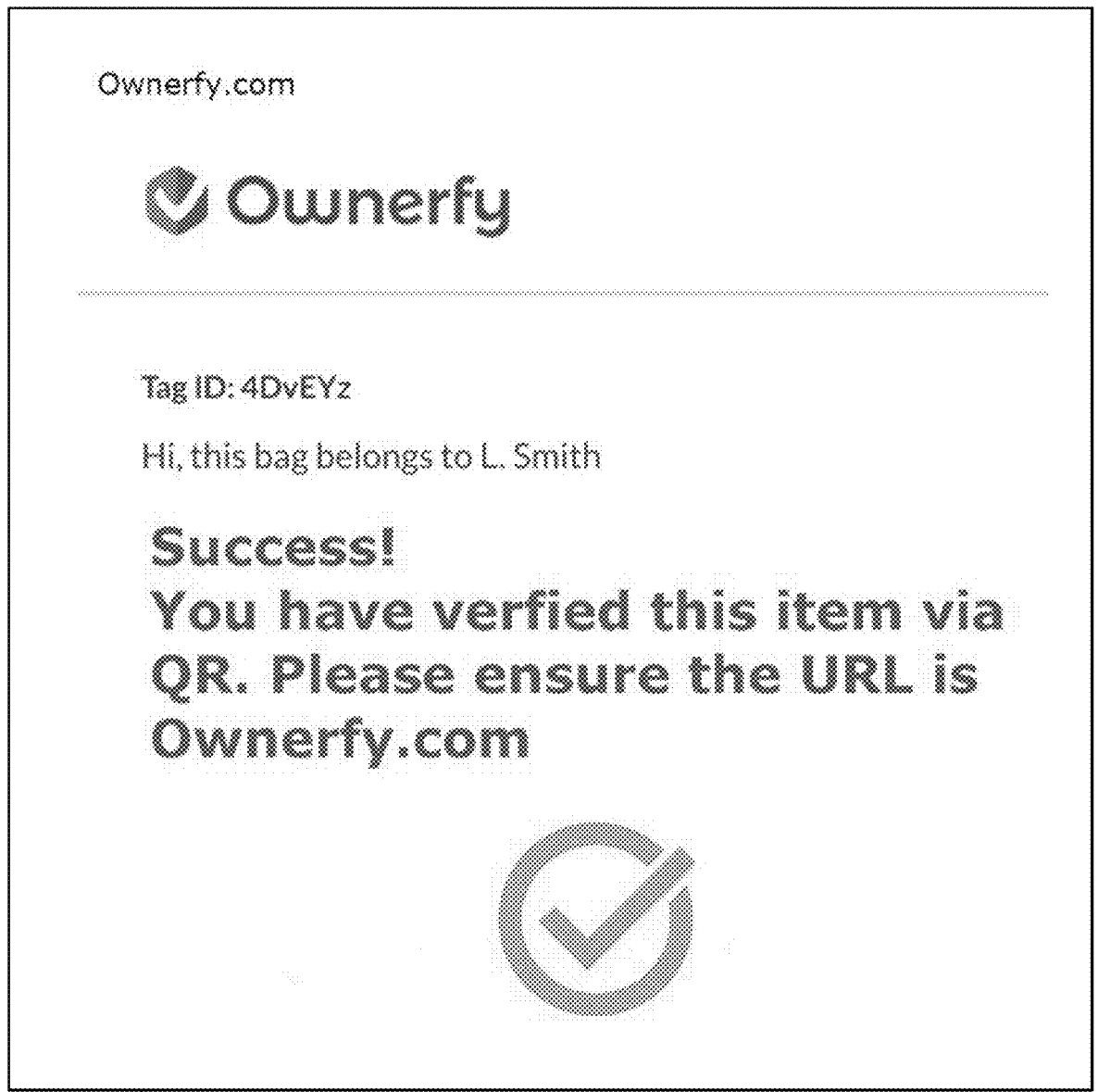

FIG. 15 illustrates an example screenshot 1500 of another text message sent to the owner. The second text message includes a matrix code (e.g. a QR code, etc.) that can be scanned by a mobile device. The scanning of the matrix code can trigger a set of operations that are implemented by a system utilizing process 1200. A verification screen shot can be displayed on the buyer's mobile device when the matrix code is scanned and found to be authentic (e.g. as shown in screenshot 1600 of FIG. 16, etc.).

As shown, the in-person verification can also be done with a two-dimensional matrix code (e.g. a QR code, etc.). A QR code can be sent instead of a text message to the owner. The verifier/sender can then scan the QR code from the owners phone (e.g. the owner's mobile device, etc.). When the code on the QR code matches the one sent, then a webpage and/or other user interface can be opened directing the verifier to a verification message for the item.

It is noted that process 1200 can also be used to verify ownership over long distance and/or when the parties are not present at the same location. In this example, a hyper link can be sent to the owners mobile device with a hyperlink in a text message. An accompanying message can instruct the user to click the hyperlink if someone is currently trying to verify an item. If the owner selects and clicks the hyper link then the verifier (e.g. the buyer) is shown (e.g. via a mobile device display) a temporary verified message on a website or in an application. The hyperlink is transient and available for a specified period (e.g. will only last up to several minutes, within a specified location, etc.). In example, instead of a hyperlink a question may also be sent. A reply of Yes or No can create the same temporary verification message on the website, etc.

Figure 17:
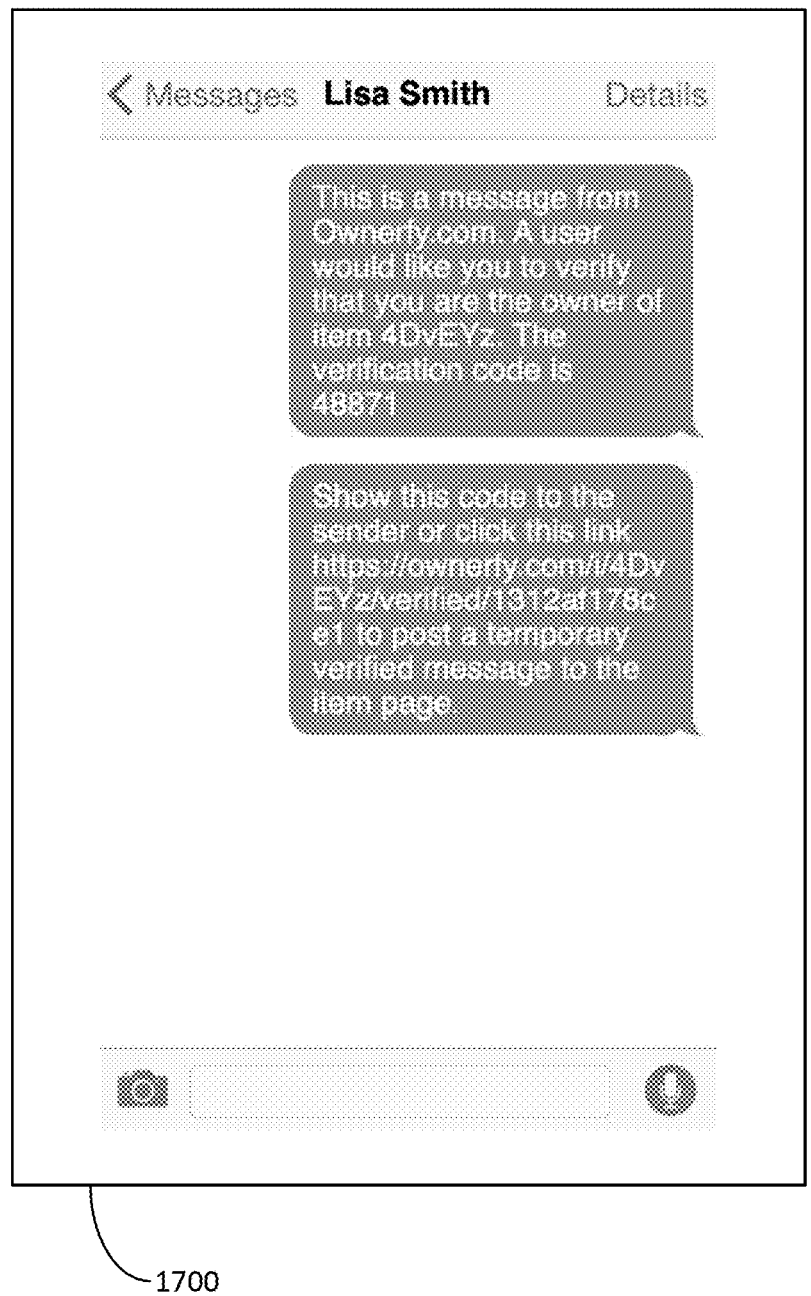

FIG. 17 illustrates an alternative embodiments, wherein an owner can click on a hyperlink sent by a text message. Clicking on this hyperlink enables the system implementing process 1200 to display screenshot 1600 on the buyer's mobile device.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for implementing a text messaging application, database, and system for automated verification of product authenticity comprising:
    providing an item for sale;
    representing the item with a unique identifier (ID) code;
    detecting that the item is purchased;
    assigning an owner of the item to that unique ID code, wherein the unique code comprises a pseudo-random generated alpha-numeric code;
    storing an owner identifier, the unique ID code, and a mobile-device number of the owner into a database;
    providing an item ownership verification application, wherein the item ownership verification application accesses a database;
    with the item ownership verification application, providing an interface to the item ownership verification application in a purchaser's mobile device, wherein the interface comprises a virtual button with a hyperlink that causes a text message to be sent to the owner's mobile device, and wherein the hyperlink is transient and available for a specified period;
    via the interface to the item ownership verification application, receiving the unique ID code when the virtual button is clicked by the purchaser;
    with the item ownership verification application, automatically generating and communicating a text message to the owner's mobile device using the mobile-device number, wherein a text message comprises the unique ID code;
    displaying the unique ID code on the owner's mobile device;
    scanning the unique ID code, wherein the unique ID code corresponds to an owner's blockchain public key and a database identity, wherein the unique ID code is compared to another code generated by the purchaser;
    detecting the purchaser has scanned the unique ID code;
    wherein the unique ID code comprises a QR code, and wherein the QR code address corresponds to the user's blockchain public key and database identity in the system that is a supplementary data in a traditional database;
    wherein a user scans the QR code to fetch history information about the item, wherein the history of the item is fetched in the application, and wherein the history information comprises an ownership history, a plurality of details about the item, and an ability to contact the owner of the item,
    detecting that the purchaser has compared and verified that the owner's id code matches the one that was displayed to them; and
    implementing transfer as a possible technical output.

2. The computerized method of claim 1, wherein the unique identifier code comprises a two-dimensional matrix code.

3. The computerized method of claim 2, wherein the two-dimensional matrix code is printed onto a sheet attached to the item.

4. The computerized method of claim 3, wherein the step of, via the interface to the item ownership verification application, receiving the unique ID code, further comprises:
    receiving a scan of the two-dimensional matrix code, wherein the scan is implemented via a digital camera of the purchaser's mobile device.

5. The computerized method of claim 4, wherein the two-dimensional matrix code comprises a QUICK RESPONSE CODE®.

6. The computerized method of claim 1, wherein the unique identifier comprises a Near-Field-Communication (NFC) tag.

7. The computerized method of claim 6, wherein the NFC tag is attached to the item.

8. The computerized method of claim 1, wherein the interface to the item ownership verification application comprises a webpage interface.

9. The computerized method of claim 1, wherein the interface to the item ownership verification application comprises a mobile device application interface operative in the purchaser's mobile device.

10. A computer system for verification of product authenticity via automated text message content comprising:
    a processor;
    a memory containing instructions when executed on the processor, causes the processor to perform operations that:
    provide an item for sale;
    represent the item with a unique identifier (ID) code;
    detect that the item is purchased;
    assign an owner of the item to that unique ID code;
    store an owner identifier, the unique ID code, and a mobile-device number of the owner into a database;
    provide an item ownership verification application, wherein the item ownership verification application accesses a database;
    with the item ownership verification application, provide an interface to the item ownership verification application in a purchaser's mobile device, wherein the interface comprises a virtual button with a hyperlink that causes a text message to be sent to the owner's mobile device, and wherein the hyperlink is transient and available for a specified period;
    via the interface to the item ownership verification application, receive the unique ID code when the virtual button is clicked by the purchaser;
    with the item ownership verification application, automatically generate and communicate a text message to the owner's mobile device using the mobile-device number, wherein a text message comprises the unique ID code;
    display the unique ID code on the owner's mobile device;
    scanning the unique ID code, wherein the unique ID code corresponds to an owner's blockchain public key and a database identity;
    detecting the owner has scanned the unique ID code; and
    using the unique ID code to re-assign the owner of the item on the blockchain and in the system to the purchaser,
    detect that the purchaser has compared and verified that the owner's id code matches the one that was displayed to them; and
    implement transfer as a possible technical output.

11. The computerized system of claim 10, wherein the unique identifier code comprises a two-dimensional matrix code.

12. The computerized system of claim 11, wherein the two-dimensional matrix code is printed onto a sheet attached to the item.

13. The computerized system of claim 12, wherein the step of, via the interface to the item ownership verification application, receiving the unique ID code, further comprises:
   receive a scan of the two-dimensional matrix code, wherein the scan is implemented via a digital camera of the purchaser's mobile device.

14. The computerized system of claim 13, wherein the two-dimensional matrix code comprises a QUICK RESPONSE CODE®.

15. The computerized system of claim 10, wherein the unique identifier comprises a Near-Field-Communication (NFC) tag.

16. The computerized system of claim 15, wherein the NFC tag is attached to the item.

17. The computerized system of claim 10, wherein the interface to the item ownership verification application comprises a webpage interface.

18. The computerized system of claim 10, wherein the interface to the item ownership verification application comprises a mobile device application interface operative in the purchaser's mobile device.

\* \* \* \* \*